United States Patent [19]

MacInnis et al.

[11] 4,360,502

[45] Nov. 23, 1982

[54] RECOVERY OF TUNGSTEN VALUES FROM ALKALI TUNGSTATE SOLUTIONS BY SOLVENT EXTRACTION

[75] Inventors: Martin B. MacInnis, Towanda; Robert P. McClintic, Monroeton; Tai K. Kim, Towanda, all of Pa.

[73] Assignee: GTE Products Corporation, Stamford, Conn.

[21] Appl. No.: 292,378

[22] Filed: Aug. 13, 1981

[51] Int. Cl.$^3$ ............................................. C01G 41/00
[52] U.S. Cl. ............................. 423/54; 75/101 BE; 204/186; 423/658.5; 423/DIG. 14
[58] Field of Search ................... 423/54; 75/101 BE; 204/186

[56] References Cited

U.S. PATENT DOCUMENTS 3,158,438  11/1964  Kurtak ................................. 423/54
3,437,575   4/1969  Gross et al. ........................ 204/186
4,039,404   8/1977  Richards et al. ............... 75/101 BE
4,120,769  10/1978  Prestudge .......................... 204/186
4,175,109  11/1979  Kim ...................................... 423/54

FOREIGN PATENT DOCUMENTS 1240524  7/1971  United Kingdom ................. 423/54

Primary Examiner—Herbert T. Carter
Attorney, Agent, or Firm—Robert E. Walter

[57] ABSTRACT

After stripping tungsten values from a loaded organic extractant in a two component extraction system for producing ammonium tungstate from aqueous alkali metal tungstate solutions, the organic extractant and aqueous solution of ammonium tungstate are fed into a settling container which includes a pair of electrodes and means for applying a direct current voltage potential for promoting coalescence of the aqueous and organic phase.

1 Claim, 2 Drawing Figures

RECOVERY OF TUNGSTEN VALUES FROM ALKALI TUNGSTATE SOLUTIONS BY SOLVENT EXTRACTION

BACKGROUND OF INVENTION

This invention relates to the recovery of tungsten values from aqueous alkali metal tungstate solutions by liquid-liquid solvent-extraction process. More particularly, the invention relates to the extraction of tungsten values by an organic mixture and subsequent recovery of an ammonium tungstate solution by stripping.

Prior art processes relating to recovery of tungsten include U.S. Pat. Nos. 3,158,438 to Kurtak; 3,256,058 to Burwell; and 3,293,004 to Musgrove et al; South African Pat. No. 684,892 and British Pat. No. 1,240,524. U.S. Pat. No. 4,175,109 to Kim relates to a tungsten extraction process.

It is an object of the present invention to provide an improved process for recovery of tungsten values from aqueous alkali metal tungstate solutions.

Other and further objects will become apparent from reading the following description.

SUMMARY

In accordance with the present invention, there is provided a process for producing ammonium tungstate from an aqueous alkali metal tungstate solution comprising the steps of: (a) extracting said tungsten values into an organic extractant by contacting said aqueous metal tungstate solution with said organic extractant for a sufficient period of time to form a loaded organic extractant containing said tungsten values and an aqueous solution, said organic extractant consisting essentially of from about 6 to about 10 percent by volume of a mixture of tri-alkyl amines having alkyl chains of about 6 to 10 carbon atoms with trisooctyl amine being the major component in said mixture and from 90 to 94 percent by volume of an aromatic solvent consisting essentially of a mixture of alkyl benzenes wherein the alkyl benzenes constituting the mixture of alkyl benzenes have molecular weights of 120, 134, 148 and the total number of atoms in the alkyl chains attached to the benzene ring are either 3, 4 or 5; (b) separating said loaded organic extractant from said aqueous solution; (c) stripping said loaded organic extractant from step (b) by contacting with an aqueous ammonia solution to form an aqueous ammonium tungstate solution and a stripped organic extractant, (d) separating said aqueous ammonium tungstate from said stripped organic extractant by feeding said aqueous ammonium tungstate and said organic extractant into a container, said container including a pair of electrodes and applying a direct current voltage potential across said electrodes for promoting coalescence of said aqueous and said organic phase; and (e) feeding said stripped organic extractant to step (a) for use as said organic extractant.

DRAWINGS

FIGS. 1-A and 1-B illustrate schematically a series of mixer-settler units that can be subdivided into an extraction circuit and a stripping circuit. The extraction circuit comprises three units or stages: a first stage 10, a second stage 12, a third stage 14, and a wash or scrub stage 16. The stripping circuit comprises or consists of a stripping column-contactor 18, followed by a mixer-settler 20, a wash stage 22, and organic regeneration stage 24.

DETAILED DESCRIPTION

Figure 1A:
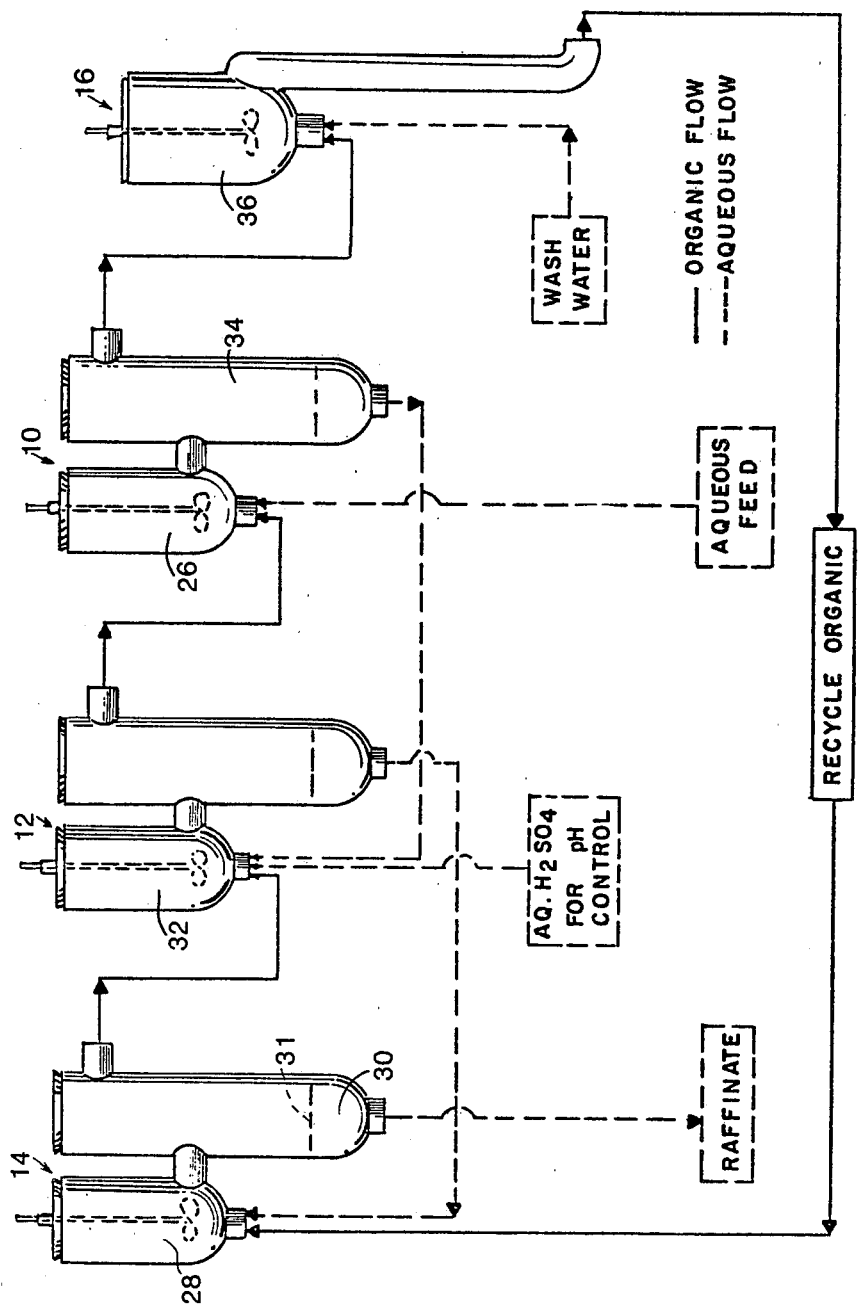

In the extraction circuit aqueous alkali metal tungstate solution, preferably sodium tungstate solution, is adjusted to a pH of about 1.8 to about 3.0, preferably a pH of about 1.8 to about 2.3. The feed tungstate solution which preferably has a concentration of grams $WO_3$/liter of from about 100 to about 200 and more preferable of from about 150 to about 180, is fed to mixing compartment 26 of the first extraction stage 10 and then to mixing compartment 32 of the second stage 12. At the same time barren or unloaded extractant is fed to the mixing compartment 28 of the third extraction stage 14 and flows countercurrently to the aqueous feed flow, i.e., from stage 14 to stage 10, while progressively extracting and loading tungstate at each stage until it reaches a maximum or other desirable loading at stage 10.

Figure 1B:
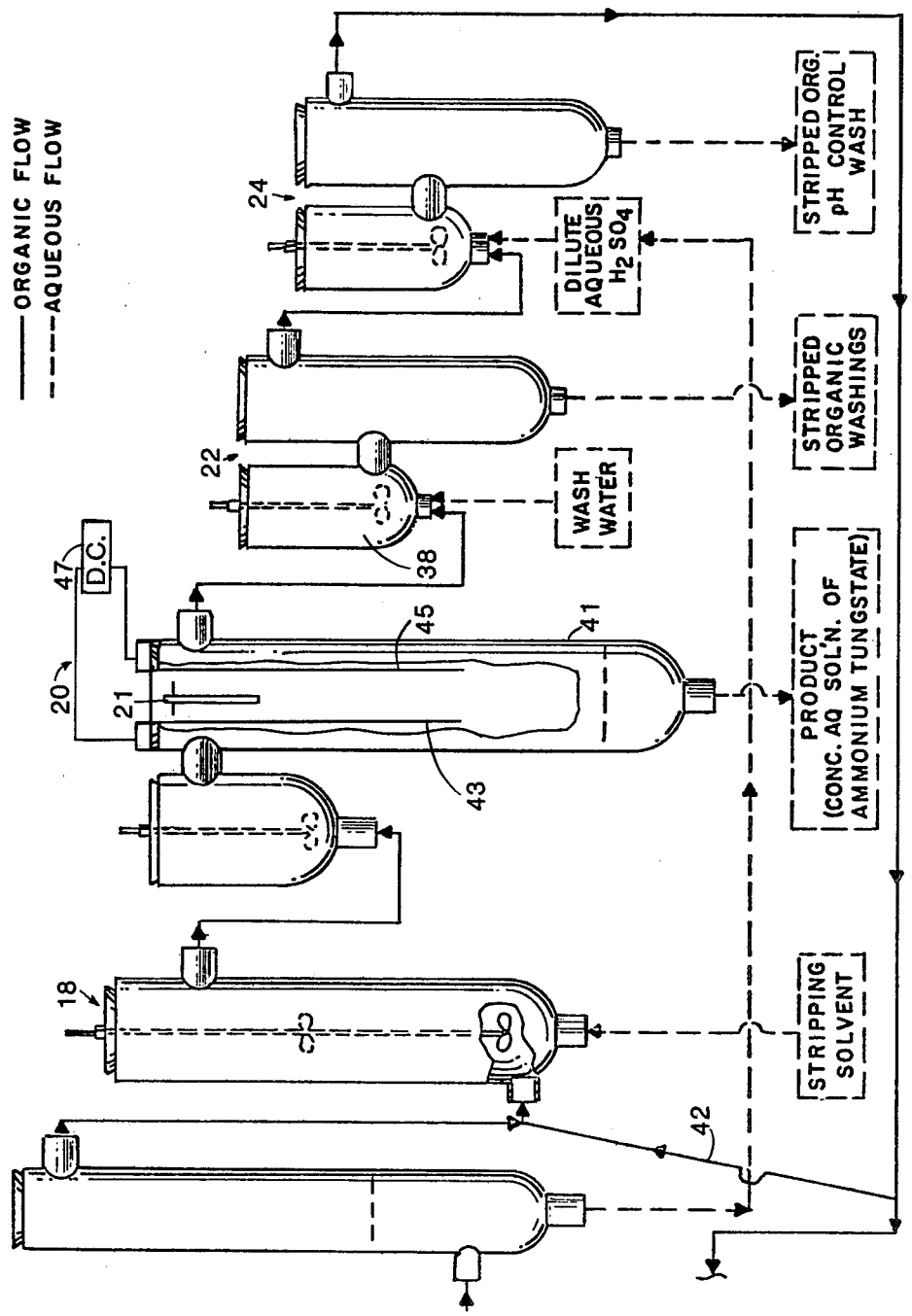

The aqueous feed solution while traveling countercurrently to the organic extractant from stages 10, 12 and 14, as is illustrated in FIG. 1-A, becomes progressively depleted of tungsten values. Substantially fully depleted tungstate solution or raffinate is discharged from the settling section 30 of stage 14. The approximate point where separation between the aqueous and organic phases occurs is shown by the broken line 31 of the settling section 30 of stage 14. Similar broken lines indicate the approximate point where phase separation occurs in settling sections of other units or stages in the system.

The loaded organic extractant from the settling section 34 of stage 10 is fed to the mixing section 36 of the wash or scrub stage 16 where it is washed with water, preferably deionized water, to reduce the amount of entrained water insoluble impurities, e.g. sodium sulfate. The settling section of the scrub stage 10 is shown in FIG. 1A.

In the stripping circuit the scrubbed, loaded organic solution flows to a point near the bottom of a columnar contactor-stripper 18 wherein it is contacted, under controlled agitation, with stripping solution that passes upwardly through the column in co-current flow.

The stripped organic solvent from the mixer-settler unit 20, which is provided with a baffle 21 in the upper part of the settling section where indicated in FIG. 1-B, flows to a wash stage 22 wherein it is scrubbed free of entrained ammonium tungstate. Scrub water, preferably deionized water is fed to the mixing compartment 38 of the wash stage 22.

In the final or organic-reactant regeneration stage 24, the stripped and washed organic extractant is regenerated or reconstituted for recycling to the third stage 14 of the extraction circuit by contact with a dilute aqueous solution of sulfuric acid. The regeneration of the organic extractant involves conversion of the amine component thereof to the sulfate or bisulfate form. The extraction of tungsten values by the amine extractant occurs by a mechanism that involves the exchange of the sulfate or bisulfate on for the tungstate ion.

The alkali tungstate feed solution may be prepared by any of the previously known procedures including caustic digestion of ore concentrates, fusion of ore concentrates, treatment of leach liquors to remove molybdenum and/or other impurities, and by other known techniques. Wolframite-ore concentrates processed by caustic digestion are preferred sources of tungsten values in order to obtain highly concentrated alkali metal tungstate solutions directly.

The scrubbed, loaded organic extractant is contacted with the stripping solution in contactor 18. Preferably a single stage stripper is utilized in accordance with the process of the present invention to achieve a quantitative stripping of tungsten values. The loaded organic extractant and stripping solution travel in co-current flow through the contactor. The ratio of organic extractant to the aqueous stripping solution based on volume is preferably from about 7.0 to one to about 3.5 to one. The contactor is operated with an excess organic phase over aqueous phase. To maintain this ratio, a proportion of the already stripped organic may be conveniently recycled through the contactor such as illustrated by recycle line 42.

The contactor 18 is preferably operated so as to maintain the organic phase as a continuous phase with the aqueous phase dispersed therein. The aqueous phase is dispersed to such an extent that settling results in the separation of the phases. The dispersion should not result in the formation of an emulsion. As illustrated in the drawing, the loaded organic extractant and the stripping solution is contacted in co-current flow.

The positioning of the lower agitator blades in the columnar-contactor 18, which should be a closed vessel is important. As illustrated in FIG. 1-B, the lower blades should be placed just above the horizontal plane across the column at a point corresponding to the top of the slide inlet for the loaded organic extractant. The location of the upper blades with respect to the distance from the top and bottom of the vessel is not critical other than that they should be so located that the upwardly flowing, agitated mixture of stripping agent and loaded organic extractant is substantially uniform; otherwise, an emulsion or a phase separation may occur. Both the upper and lower blades are attached to a shaft. The r.p.m. is adjusted so that the admixed stripping agent and loaded organic extractant flow upwardly as a mass with the aqueous dispursed in the organic phase.

In the contactor 18, the ratio of the length (L) to the diameter (D) of the stripping column-contactor 18 should have a value for L with respect to D sufficiently high so that adequate contact takes place between the aqueous stripping agent and the loaded organic extractant.

The final stripping solution being fed to the columar contactor 18 comprises an ammonia gassed solution of dilute ammonium tungstate solution containing about 20 to about 50 grams of $WO_3$ per liter. Gassing is controlled to give a pH of 10.0 to 11.0 which is the preferred range, and more preferably from 10.6 to 11.0.

Extraction units other than mixer settlers may be employed without affecting the operation of the contactor-stripper 18. Examples of such other types of extraction units are centrifugal devices, multi-stage columns of various types including unpacked columns, packed columns, pulse-type columns and others.

With starting concentrations in the aqueous feed and in the loaded organic as hereinbefore described, the desired product which exits from mixer settler 20 is an aqueous solution of ammonium tungstate comprising from about 200 to about 300 grams of $WO_3$ per liter. Substantially all of the tungsten values are recovered as ammonium tungstate after passing through units 18 and 20.

The mixer settler 20 is provided for additional agitation and settling for separation of the organic and aqueous phases. Mixed stripped organic extractant may be fed directly to a settling unit with proper sizing of the column stripping unit.

In accordance with the principles of the present invention, the mixer-settler unit 20 comprises a container or settling section 41. The container is provided with a pair of electrodes 43, 45 connected to a direct current source 47 for providing an electrical potential between electrodes 43, 45 of sufficient magnitude to promote coalescence of the aqueous and organic phase. It is contemplated that one of the electrodes 43, 45 may be the container itself if the container is sufficiently electrically conductive. It has been found that voltages as low as about 15 volts are effective in promoting coalescence.

The organic extractant employed is a two component extractant consisting essentially of an active amine extractant and an organic solvent. The extractant is described in detail in U.S. Pat. No. 4,175,109 to Kim, issued Nov. 20, 1979, which is incorporated by reference into the present application.

EXAMPLE I

The stripping circuit as described in the drawings is carried out on a small scale. For each of the units 20, 22, and 24, the mixing section holds about 50 milliliters and the settling section holds about 150 milliliters of liquid. The stripping solution was an ammonia gassed solution containing about 30 grams of $WO_3$ per liter. The gassing is controlled to give a pH of from about 10.6 to 11.0. The loaded organic consisted of 8 percent by volume Adogen 381, 92 percent by volume SC solvent 150 which was contacted with 1.5 N sulfuric acid to make the amine salt prior to loading by contacting with sodium tungstate solution. The small scale stripping circuit was operated by feeding the organic solution and the aqueous solution at the rate of 80 and 100 milliliters per minute, respectively, while maintaining the organic to aqueous phase ratio at three to one based on volume.

The settling portion of the stripping is equipped with a pair of stainless steel screen electrodes. Each electrode has a surface area of about square centimeters and is suspended in the settling portion. The electrodes are connected to a Sorenpen high voltage D.C. power supply Model 230-GP-RD, rated 30,000 volts at 6 amp. current. The voltage was increased slowly to about 17.5 volts over about a 75 minute period and then maintained at 17.5 volts. The aqueous organic mixture in the settling section was initially opaque due to the formation of an emulsion. After about 60 minutes the mixtures became clear and remained clear during the operation of the unit. Separation by promoting coalescence in the liquid-liquid phase so as to crack the emulsion.

While there has been shown and described what are considered preferred embodiments of the present invention, it will be obvious to those skilled in the art that various changes and modifications may be made therein without departing from the scope of the invention as described in the appended claims.

We claim:
1. A process for producing ammonium tungstate from an aqueous alkali metal tungstate solution comprising the steps of: (a) extracting tungsten values into an organic extractant by contacting said aqueous alkali metal tungstate solution solution with said organic extractant for a sufficient period of time to form a loaded organic extractant containing said tungsten values and an aqueous solution said organic extractant consisting essentially of from about 6 to about 10 percent by volume of a mixture of tri-alkyl amines having alkyl chains of about 6 to about 10 carbon atoms with trisooctyl amine being the major component in said mixture and from 90 to 94 percent by volume of an aromatic solvent consisting essentially of a mixture of alkyl benzenes wherein the alkyl benzenes constituting the mixture of alkyl benzenes have molecular weights of 120, 134, 148 and the total number of atoms in the alkyl chains attached to the benzene ring are either 3, 4, or 5; (b) separating said loaded organic extractant from said aqueous solution; (c) stripping said loaded organic extractant from step (b) by contacting with an aqueous ammonia solution to form an aqueous ammonium tungstate solution and a stripped organic extractant, said stripping being carried out by maintaining said organic extractant as a continuous phase with the aqueous ammonia solution dispersed therein and volume ratio of organic extractant to aqueous ammonia solution at a ratio of from about 7.0 to about 3.5 to one, (d) separating said aqueous ammonium tungstate from said stripped organic extractant by feeding said aqueous ammonium tungstate and said organic extractant into a container, said container including a pair of electrodes and applying a direct current voltage potential across said electrodes for promoting coalescence of said aqueous and organic phase; (e) separating said aqueous phase and said organic phase comprising stripped organic extractant; and (f) feeding said stripped organic extractant to step (a) for use as said organic extractant.

* * * * *

UNITED STATES PATENT AND TRADEMARK OFFICE
CERTIFICATE OF CORRECTION

PATENT NO. : 4,360,502

DATED : Nov. 23, 1982

INVENTOR(S) : Mac Innes et al

It is certified that error appears in the above—identified patent and that said Letters Patent is hereby corrected as shown below:

Claim 1, column 6, line 3, after "to" insert --one to--.

Signed and Sealed this

Fifteenth Day of November, 1988

Attest:

DONALD J. QUIGG

*Attesting Officer*  *Commissioner of Patents and Trademarks*